United States Patent
Flores, Jr. et al.

[19]
[11] Patent Number: 6,119,872
[45] Date of Patent: Sep. 19, 2000

[54] DISC STORAGE CONTAINER WITH PRELOAD

[75] Inventors: Victorio T. Flores, Jr., Rancho Palos Verdes; Victorio M. Flores, III, San Pedro; Ernst C. Benjamins, Covina, all of Calif.

[73] Assignee: Filam National Plastics, Gardena, Calif.

[21] Appl. No.: 09/303,866

[22] Filed: May 3, 1999

[51] Int. Cl.[7] .................................................. A47G 29/00
[52] U.S. Cl. ......................... 211/40; 312/9.64; 206/310; 220/4.27
[58] Field of Search ..................... 206/454, 451, 206/308.1, 1.5, 310; 220/4.26, 4.27; 211/40; 312/9.1, 9.9, 9.45, 9.46, 9.64, 135

[56] References Cited

U.S. PATENT DOCUMENTS

| | | | |
|---|---|---|---|
| 1,320,958 | 11/1919 | Albrecht et al. | 312/9.64 |
| 1,638,227 | 8/1927 | Witchger . | |
| 1,746,926 | 2/1930 | Boyle, Jr. . | |
| 2,678,861 | 5/1954 | Funk | 312/10 |
| 3,007,702 | 11/1961 | Eby | 274/1 |
| 4,377,233 | 3/1983 | Pahler | 206/310 |
| 4,705,163 | 11/1987 | James | 206/45.32 |
| 4,784,263 | 11/1988 | Stanley | 206/310 |
| 5,031,779 | 7/1991 | Szenay et al. | 211/40 |
| 5,671,856 | 9/1997 | Lisch | 220/4.27 |

FOREIGN PATENT DOCUMENTS

| | | |
|---|---|---|
| 380008 | 8/1990 | European Pat. Off. . |
| 618912 | 3/1949 | United Kingdom . |

OTHER PUBLICATIONS

Disc containing digital photographs of the features of a disc storage container manufactured by TDK Corporation, with accompanying printouts of the photographs.

*Primary Examiner*—Paul T. Sewell
*Assistant Examiner*—Troy Arnold
*Attorney, Agent, or Firm*—Christie, Parker & Hale, LLP

[57] ABSTRACT

A container for storing optical discs such as CD-R discs or the like is provided. The container includes a circular base which includes a baseplate with a transverse flange around its outer periphery. A spindle which is configured for accommodating a plurality of discs is removably attached to the base. A lid which has a generally circular top and a skirt depending therefrom and which includes engagement flanges is removably mounted onto the base by means of engagement between the flanges on the lid and the baseplate flange.

14 Claims, 7 Drawing Sheets

DISC STORAGE CONTAINER WITH PRELOAD

FIELD OF THE INVENTION

The present invention relates generally to storage containers, and more particularly to a storage container which is configured to store an optical disc, such as a CD-R or the like. The storage container of the present invention is configured to maintain the discs securely within the container and to prevent dust from contacting the discs during shipping and storage.

BACKGROUND OF THE INVENTION

Optical discs such as CD-Rs are well known. Such optical discs are shipped from the optical disc manufacturer to the retail outlet or to other customers such as replicators in various containers. Some of the containers are capable of holding a plurality of such discs, for example, up to 50 discs, which provides for economy of packaging.

As those skilled in the art will appreciate, optical discs are subject to being damaged by mishandling. Although the bottom surface of such optical discs comprises a layer of polycarbonate or the like which has a thickness of approximately 0.050 in (and which is thus comparatively durable and resistant physical damage), the top surface of such optical discs comp a delicate aluminum film which typically has a thickness of 1 micron.

Protective storage containers which are used to facilitate shipping, handling, and storage of optical discs desirably protect the optical discs from physical damage.

It is desirable that the shipping container used for shipping a plurality of such discs be constructed so that dust is prohibited from entering the container and contacting the discs. Such discs may be particularly susceptible to attracting dust and dirt because of electrostatic charges which can build up on the discs.

Additionally, it is preferred that the container, when filled with the designed number of discs, be constructed so as to remain closed when subjected to the normal impact associated with shipping, such as bumping, jarring and the like.

SUMMARY OF THE INVENTION

In accordance with the present invention, there is provided a container for removably storing a plurality of optical discs. In one embodiment, the container comprises a generally circular base comprising a baseplate with a flange around its outer periphery. The flange has an outer surface and an inner surface, wherein a plurality of spaced-apart engagement bump s are on its inner surface. A cover or lid, which is on the base, has a circular top and a cylindrical skirt which depends downwardly therefrom. The skirt includes a plurality of spaced-apart elongated flanges which extend outwardly or radially from the bottom edge or rim of the skirt. Each such elongated cover flange has an indentation for engaging one of the bumps on the base flange to thereby reversibly lock the cover onto the base. A spindle, which is configured for accommodating a plurality of discs, is removably attached to the base and extends from the base substantially to the cover top.

In one embodiment, the base flange extends above and below the plane of the baseplate. The plurality of spaced-apart engagement bumps comprises two sets of such engagement bumps. A first set of bumps is on a first side of the baseplate plane, and a second set is on a second or opposite side of the baseplate plane. In this embodiment, a first cover is on one side of the base, and a second cover is on the opposite side of the base. The elongated outwardly extending flanges of the first cover are reversibly engaged with the first set of bumps, and the elongated outwardly extending flanges of the second cover are reversibly engaged with the second set of bumps.

In one embodiment, the base flange includes a plurality of radially spaced-apart horizontal projections extending toward the center of the base away from the flange. Each of said cover flanges has a leading edge and a trailing edge. In a first partially engaged position, the leading edge of each cover flange is beneath one of the horizontal projections. In one embodiment, the cover flange indentation is closer to the leading edge than it is to the trailing edge. In a second fully engaged position, the leading edge of each cover flange is beneath the horizontal projection, and the bump is reversibly engaged with the cover flange indentation.

DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

The detailed description set forth below in connection with the appended drawings and claims is intended as a description of the presently preferred embodiment of the invention and is not intended to represent the only form in which the present invention may be constructed or utilized. The detailed description sets forth the construction and functions of the invention. It is to be understood, however, that the same or equivalent functions may be accomplished by different embodiments which are also intended to be encompassed within the spirit and scope of the invention.

The disc storage container 10 provided in accordance with practice of the present invention is illustrated in FIGS. 1–8 which depict a presently preferred embodiment thereof.

Figure 1:
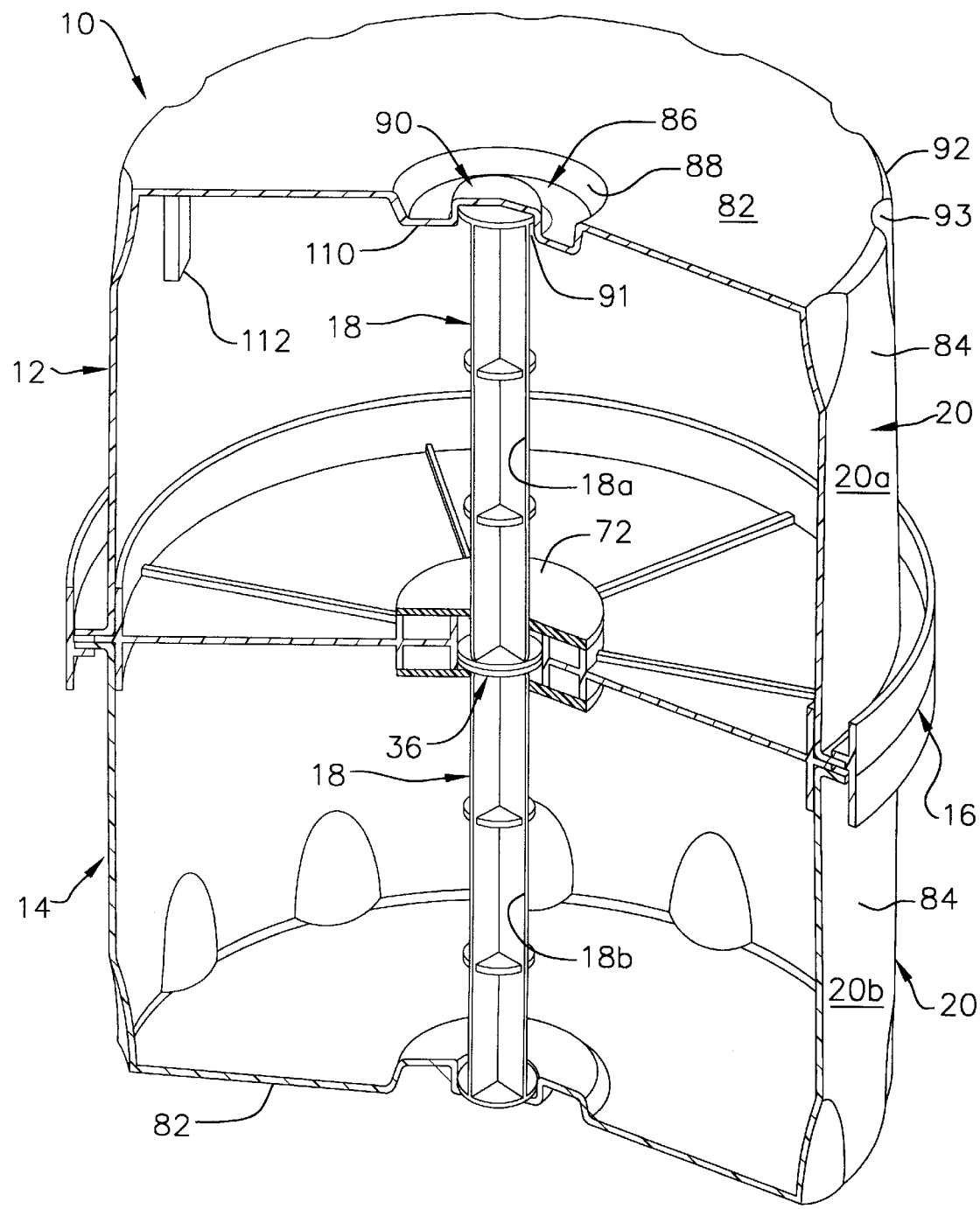
FIG. 1 is a semi-schematic perspective view of one embodiment of an optical disc container configured for removably storing a plurality of optical discs therein showing a base with a hub at its enter, a pair of spindles extending in opposite directions from the base, and top and bottom covers or lids reversibly locked onto each base.

Referring to FIG. 1, there is shown a fully assembled disc storage container 10 in the absence of CD-R discs. The embodiment shown in FIG. 1 includes two container modules; namely, a first container module 12 assembled on top of a second container module 14. Each of the container modules is designed to hold a plurality of optical discs such as CD-R discs. In one embodiment, 50 such discs are carried within each module. The two modules are mirror images of one another and thus the detailed structure of only one need be described herein.

The container 10 includes separate components which are assembled together to form the completed assembly. The components include a base 16 which, as is described below in detail, can accommodate a pair of separate elongated spindles 18 and a pair of flexible covers or lids 20. A first spindle/lid combination 18a, 20a is on one side of the base 16 and a second spindle/lid combination 18b, 20b is on the opposite side of the base. While the base 16 of the illustrated embodiment can accommodate a pair of spindles and lids, a base which only accommodates a single lid and spindle is contemplated to be within the scope of the invention.

In one embodiment, the base, spindle, and cover components are manufactured by separately injection molding a plastic resin composition. The base and spindle can be injection molded from an impact polystyrene or ABS material or other suitable injection molding grade plastic material. The cover is preferably clear, i.e., transparent, and can be injection molded from a resilient material such as a clear ABS, clear polystyrene, a styrene-butadiene block co-polymer such as K-resin produced by Phillips 66 Company, or other suitable clear injection molding grade plastic material.

Figure 2:
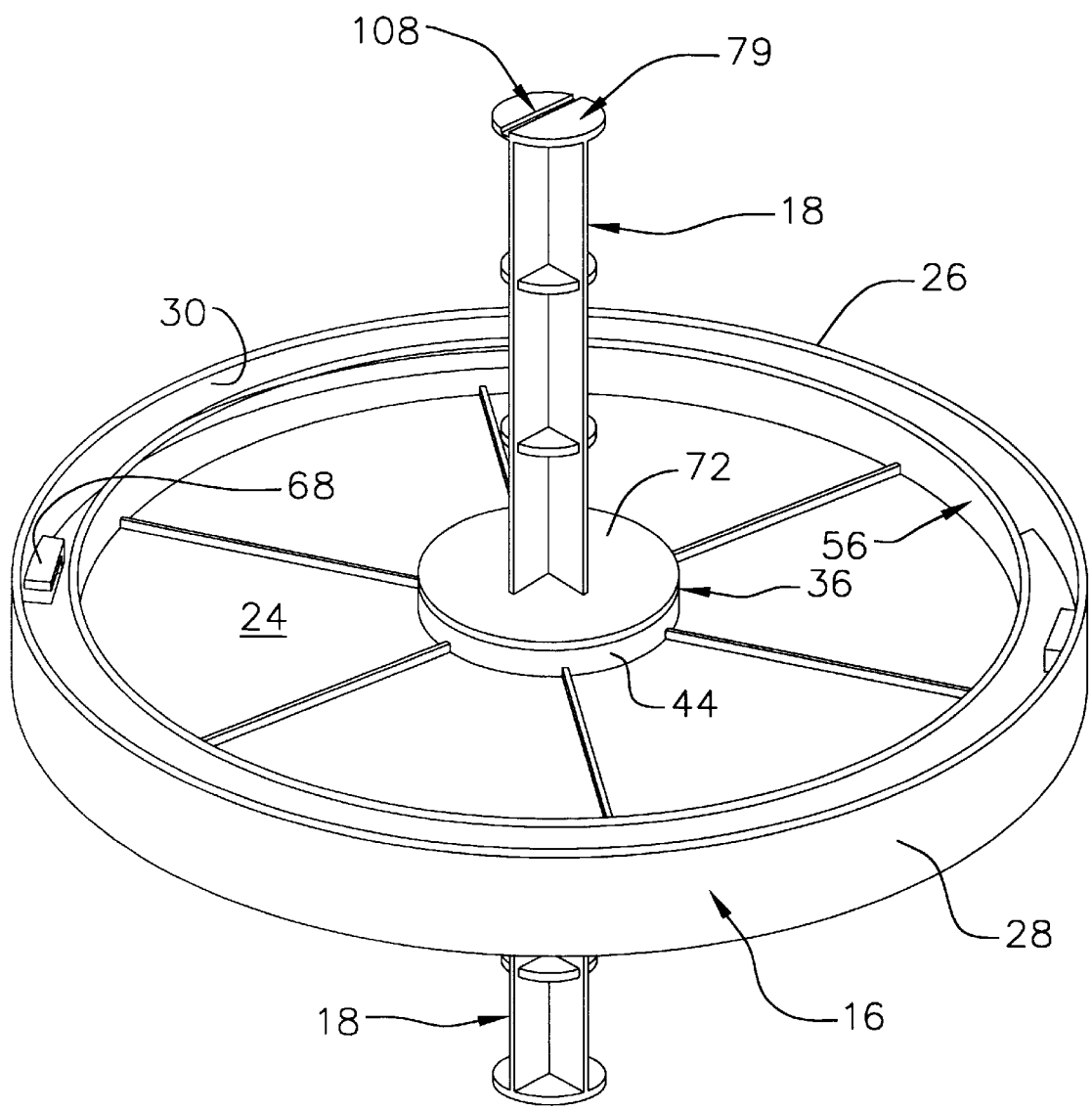
FIG. 2 is a semi-schematic perspective view of the base and engaged spindles of the embodiment of FIG. 1 in the absence of the associated covers.
Figure 3:
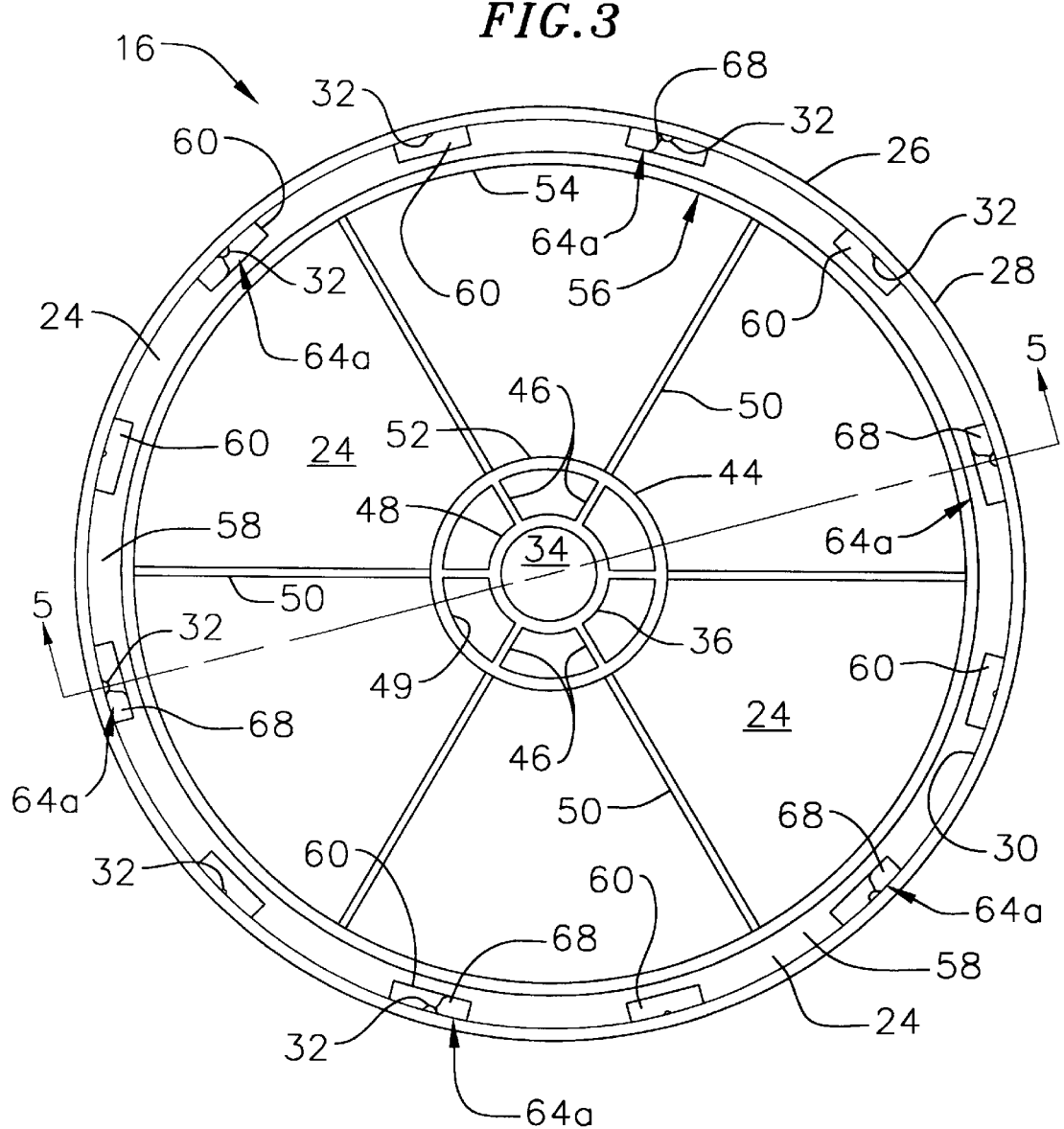
FIG. 3 is the top plan view of the base of the embodiment of FIG. 1.
Figure 4:
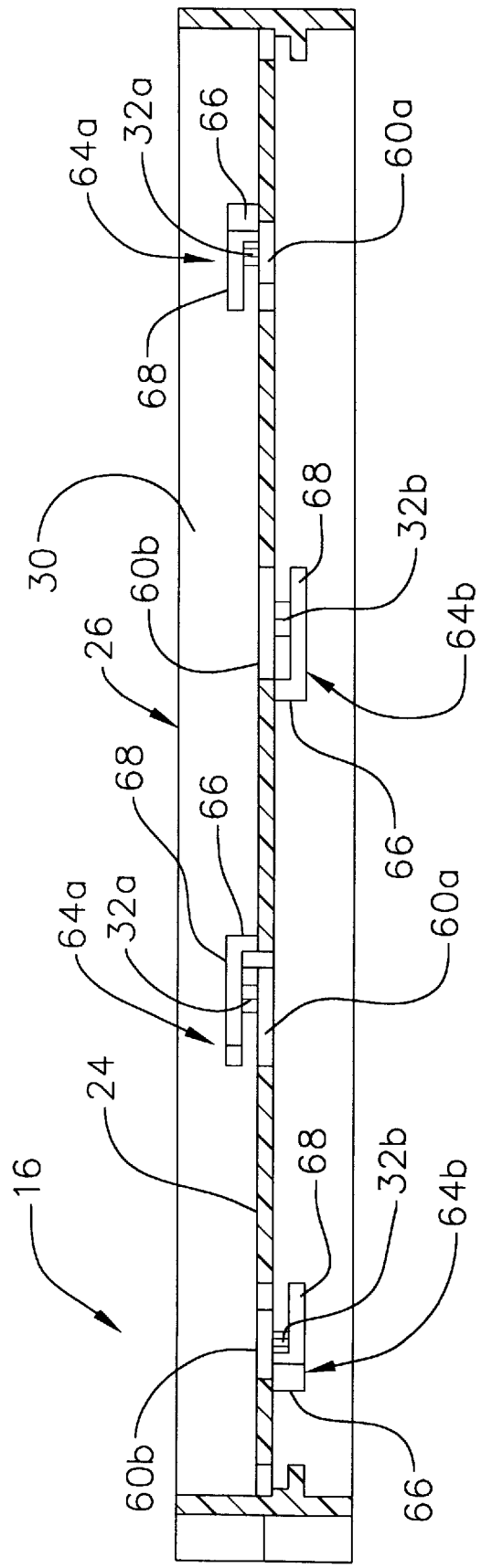
FIG. 4 is a semi-schematic elevational cut-away view, in partial cross-section, showing a portion of the base.

Turning to FIGS. 2, 3 and 4, in the illustrated embodiment, the base 16 is circular and comprises a baseplate 24 which bisects a transverse flange 26 which extends around the outer periphery of the baseplate. The flange 26 has an outer surface 28 and an inner surface 30. A plurality of radially spaced-apart engagement bumps 32 are on the inner surface of the flange. Turning particularly to FIGS. 3 and 4, the engagement bumps are provided in two separate rows, with the first row 32a being at a relatively higher elevation on the inside surface 30 of the base flange 26 on one side of the baseplate 24 and the second row 32b being at a relatively lower elevation on the inside surface of the base flange on the opposite side of the baseplate. In the illustrated embodiment, the first row of engagement bumps comprises six bumps 32a radially spaced apart from each other by 60° along the inner flange surface 30 at a constant first elevation. The second row of engagement bumps comprises six bumps 32b radially spaced apart from each other by 60° along the flange inner surface 30 at a second constant elevation. Each such bump 32b is spaced apart 30° radially from each bump 32a, and the bumps 32a and 32b alternate circumferentially around the flange surface.

Figure 5:
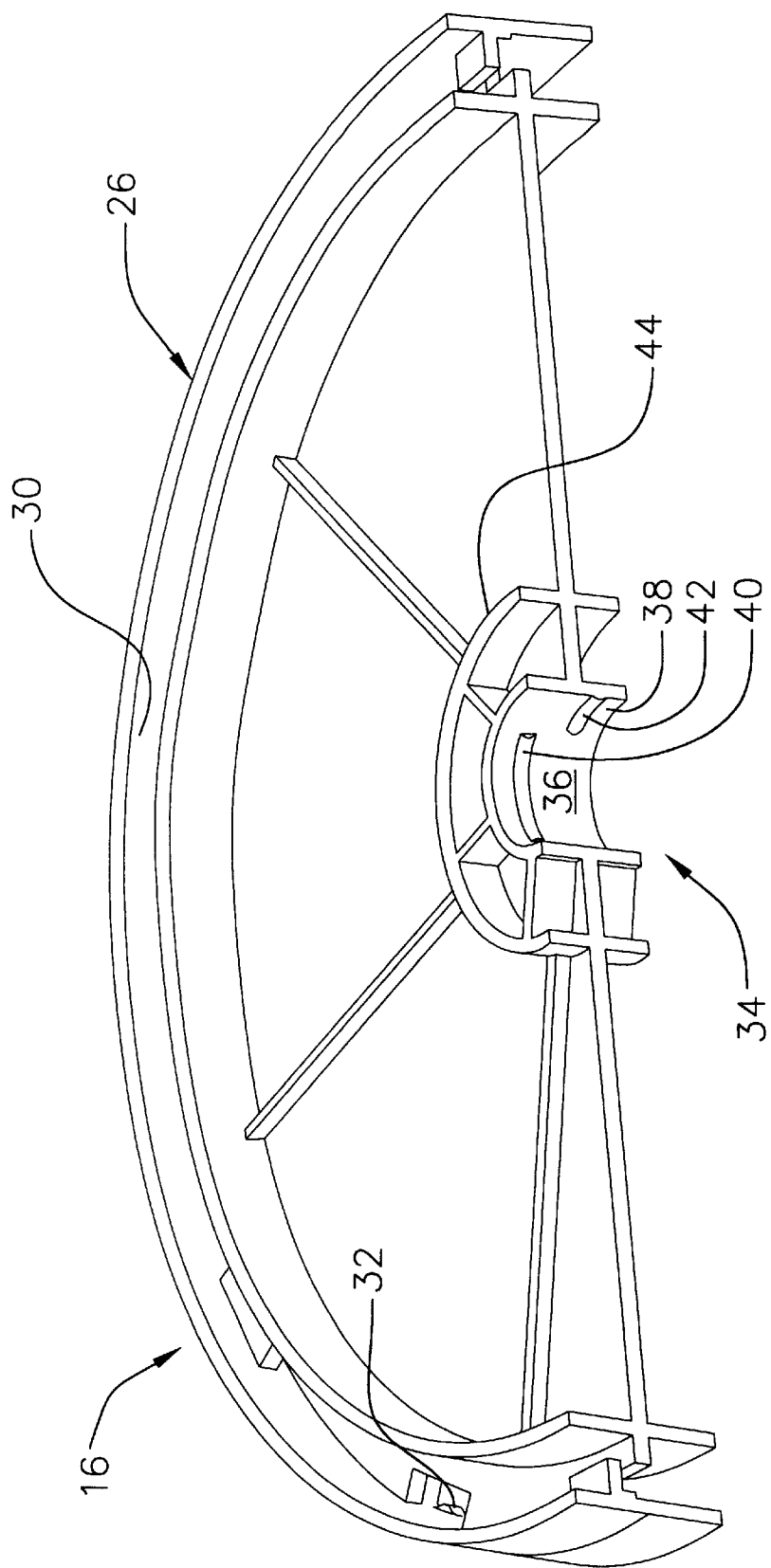
FIG. 5 is a semi-schematic perspective, partially cut-away, cross-sectional view taken on line 5—5 of FIG. 3 showing the inside surface of the hub at the center of the base.

Turning particularly to FIGS. 2, 3, and 5, the base 16 has an opening 34 through its center which engages the engagement or flange ends 36 of the spindles 18 to hold them in place. One such spindle extends in one direction from the opening and the other spindle extends in the opposite direction. The opening 34 is defined by a hub 36 which extends through the baseplate 24 and includes a cylindrical wall 38. The cylindrical wall 38 has two pairs of spaced-apart elongated ridges 40, 42 (only one ridge of each pair is shown in FIG. 5) extending circumferentially along a portion of the inner surface thereof. Each ridge of the first pair of ridges 40 circumscribes about 90° of the surface of the wall 38. The first ridges face each other and are present at an upper or first elevation on the wall 38. Each ridge of the second pair of ridges 42 circumscribes about 90° of the surface of the wall 38. The second ridges face each other, are offset about 90° from the first pair of ridges 40, and are present at a lower or second elevation on the wall 38.

A cylindrical reinforcing wall 44, surrounds the hub 36. Six ribs 46, which are radially spaced 120° apart from each other, extend radially from the outside surface 48 of the hub 36 to the inside surface 49 of the wall 44. Six ribs 50, which are radially spaced 120° apart from each other, extend from the outside surface 52 of the wall 44 to the inside surface 54 of a circular flange 56 which extends transversely from the baseplate at a location spaced inwardly from the flange 26. A channel 58 is defined between the outer flange 26 and the inner flange 56 with the baseplate 24 forming the channel bottom. The structure described above, including the hub 36, the reinforcing wall 44, and the reinforcing ribs 46 and 50 are present as mirror images on both sides of the baseplate.

Turning to FIGS. 3 and 4, a plurality of rectangular cutouts 60 are through the baseplate 24 in that portion of the baseplate between the flanges 26 and 56, i.e., that portion of the baseplate that forms the bottom of the channel 58. In the exemplary embodiment, the cutouts 60 are rectangular in shape and each has one of the engagement bumps 32 in registry with about the center of the circumferential length of the cutout. A locking assembly 64 for reversibly locking the lid to the base is associated with each cutout. The locking assemblies 64a, for the lid which is reversibly locked to one side of the baseplate, are associated with the cutouts 60a. The locking assemblies 64b, for the lid which is reversibly locked to the opposite side of the baseplate, are associated with the cutouts 60b.

In an exemplary embodiment, there are 12 cutouts through the baseplate and six locking assemblies 64a associated with one of the lids and six locking assemblies 64b associated with the other lid. The cutouts are spaced apart from each other by 30°, and the locking assemblies associated with each cutout alternate circumferentially between those which are associated with the lid on one side of the base and those which are associated with the lid on the other side of the base.

As is best seen in FIG. 4, each of the locking assemblies 64 includes a vertically extending leg portion 66 and a horizontally extending roof section or projection 68 which are integrally formed on the inner surface of the base flange 26 and which extend inwardly toward the axial center of the base from the flange.

Figure 6:
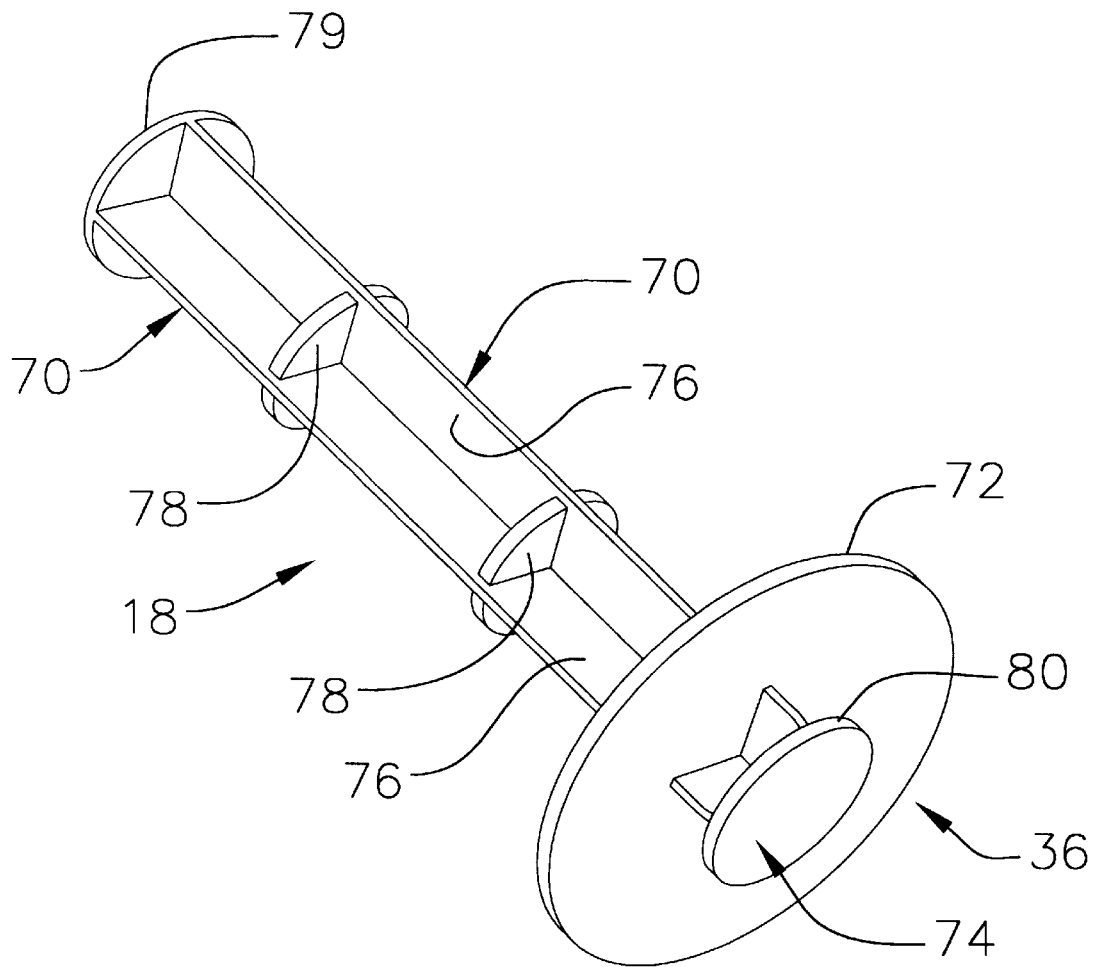
FIG. 6 is a semi-schematic perspective view of the spindle of the embodiment of FIG. 1.

Turning particularly to FIG. 6, the spindle 18 of the illustrated embodiment incorporates an elongated post 70 which extends vertically away from the spindle engagement or flange end 36. The engagement end 36 includes a circular, relatively larger diameter flange 72 on the post 70 above a circular, relatively smaller engagement flange 74 which defines the spindle bottom. In one example, the flange 72 is approximately 0.130 inch above the engagement flange 74. The structure of the elongated post 70 comprises four elongated flat post sections 76 (only two of which are shown in FIG. 6) which are spaced 90° apart from each other in a cruciform configuration. A pair of pie-shaped reinforcing members 78 are vertically spaced apart from each other between each two adjacent post sections along the length of the post. A circular flange 79 is on the opposite end of the post from the engagement flange 74.

Turning again to FIGS. 3 and 5 in addition to FIG. 6, the mechanism for mounting the spindles 18 to the base 16 can be understood. Each of the ridges 40 of the first pair of ridges extends into the opening 34 a sufficient distance so that when the spindle base 36 of a first spindle 18 is extended into the opening 34 from one side of the baseplate, the peripheral edge 80 of the circular flange 74 initially engages the ridges 44 and then snaps down past the ridges until the bottom surface of the flange 72 engages the top of the hub 36 and the reinforcing wall 44. In this engaged condition, the first spindle 18 is removably mounted on the base. Each of the ridges 42 of the second pair of ridges extends into the opening 34 a sufficient distance so that when the spindle base 36 of a second spindle 18 is extended into the opening 34 from the opposite side of the baseplate from the first spindle, the peripheral edge 80 of the circular flange 74 initially engages the ridges 44 and then snaps down past the ridges until the bottom surface of the flange 72 engages the top surface of the hub and reinforcing wall on the opposite side of the baseplate.

If desired, each of the spindles can be removed from the opening by exerting a pulling force along the spindle axis to snap it back out past the respective ridges 40, 42.

The dimensions of the base of the spindle and the opening through the hub are sized so that once the spindle is mounted on the hub, it will not tilt more than a few degrees (i.e., more than about 2–6° or so) off center. In an exemplary embodiment, the spindle is stopped from tilting when a tilting force is applied in any given direction by the bottom surface of the flange 72 contacting the top surface of the cylindrical reinforcing wall 44 in combination with the peripheral edge 80 of the engagement flange 74 engaging the respective ridges 40, 42.

Once each spindle is on the base, 50 CD-R discs can be placed onto each spindle and the cover 12 can then be fitted down over the discs and engaged in position on the base. It should be understood that the disc container of the present invention can be produced of a size which can accommodate more or less than 50 CD-R discs.

Figure 7:
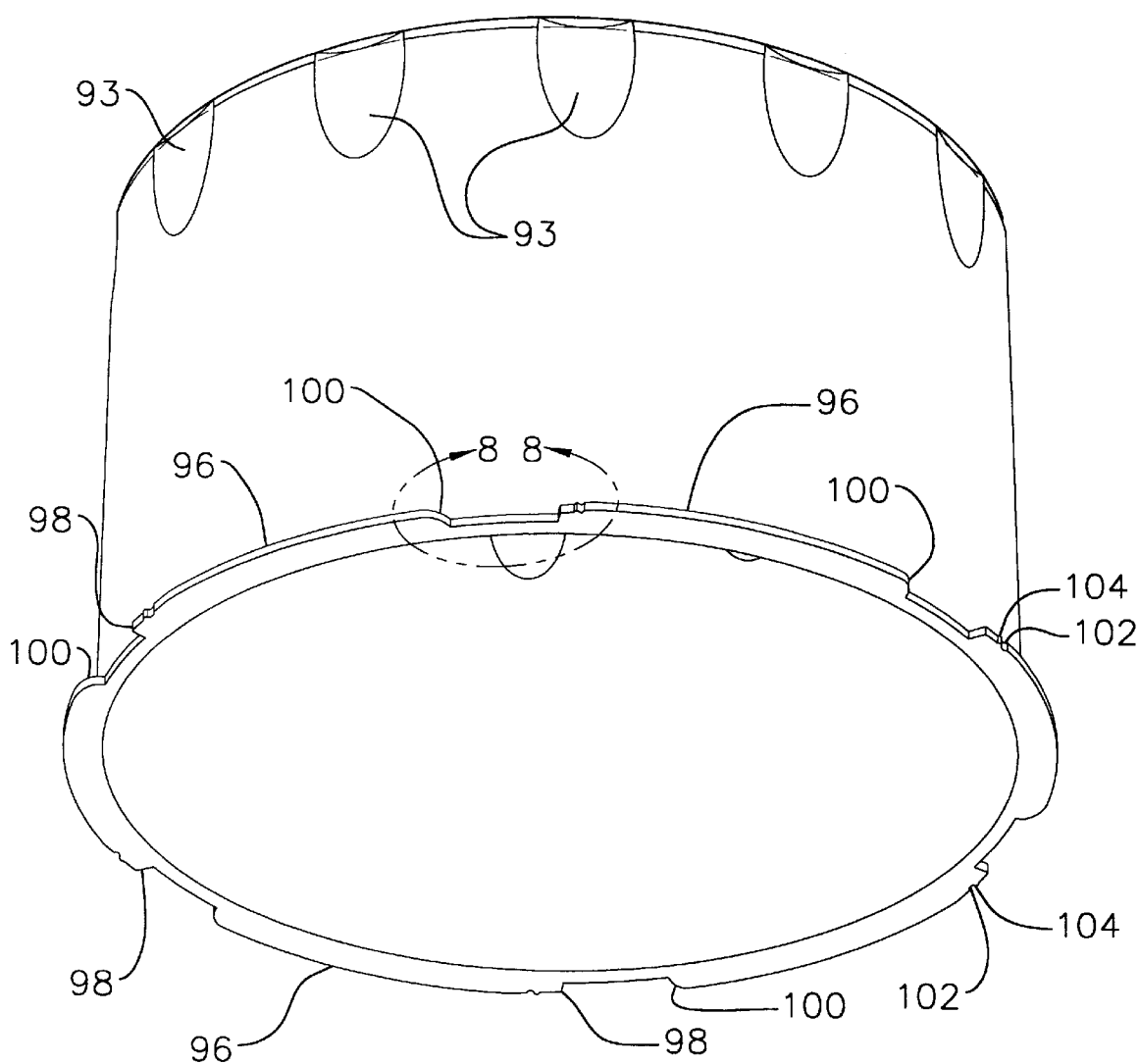
FIG. 7 is a semi-schematic perspective view showing the cover of the embodiment of FIG. 1.
Figure 8:
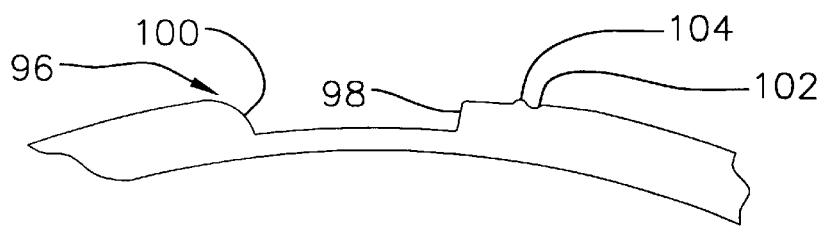
FIG. 8 is a semi-schematic exploded view showing a portion of the cover flange within the circle 8—8 of FIG. 7.

Turning now to FIGS. 1, 7, and 8, the detailed structure of the lid, including the structure which facilitates its engagement with the base, can be understood. The lid 20 of the exemplary embodiment has a generally circular top 82 and a cylindrical skirt 84 which depends axially therefrom. In the illustrated embodiment, a ring-shaped indentation or depression 86 is molded in the circular top surrounding its center. The depression is bounded by a annular outer wall 88 and a cylindrical protrusion 90 which is at the center of the ring. The protrusion 90 provides a downwardly opening recess 91. The circular top slopes downwardly from its periphery 92 to the top edge of the annular outer wall 88 at about a 1–2° angle. A plurality of radially spaced-apart finger-grip indentations 93 extend downwardly from about the juncture of the top 82 and skirt 84.

A plurality of circumferentially spaced-apart elongated flanges 96 extend radially outwardly from the periphery or rim 98 of the skirt. In one exemplary embodiment, there are six circumferentially spaced-apart flanges 96 extending from the skirt rim. Each flange has a leading edge 98 and a trailing edge 100. As is described below in detail, when a first lid 20 is installed on one side of the base, the six flanges 96 are engaged with the six locking assemblies on the base on one side of the baseplate. When a second lid 20 is installed on the opposite side of the base from the first lid, the six flanges 96 of the second lid are engaged with the six locking assemblies which are on the base on the opposite side of the baseplate.

Each of the flanges 96 includes an indentation 102 in its outer radially extending edge on the leading edge portion of the flange. Each of the flanges also includes a projection or stop 104 which extends radially outwardly from the outer radially extending edge. The projections 104 are adjacent the respective flange indentations 102 and are closer to the leading edge 98 of each of the flanges than are the indentations.

Turning back to FIGS. 3 and 5, each of the bumps 32 on the inner wall 30 of the outer flange 26 is at an elevation on the flange so that the bump can first engage the stop and then the indentation on each flange as the cover is turned from its top in a clockwise direction on the base.

A first lid 20 is mounted in a first or partially engaged position on one side of the base by initially placing the six cover flanges 96 between the six locking assemblies 64 on that side of the base. In this condition, the top of the spindle is rotatably engaged within the recess 91 in the center of the circular lid top. The lid is then turned or rotated from its top in a clockwise direction until each of the bumps 32 on the side of the base being engaged contacts the outwardly extending projection or stop 104 on each of the flanges. In this first engaged position, the leading edge portion 98 of each flange 96 extends under each respective horizontal locking assembly projection 68. In one embodiment, in the first engaged position, the leading edge extends under approximately three-quarters of the length of the locking assembly projection. In the first engaged position, the lid cannot be disengaged from the base without rotating it back in the counterclockwise direction because if a force is applied to pull the lid from the base, the flanges 96 will contact the bottom surface of the locking projections 68, thereby prohibiting lid removal.

In a second or fully engaged position, the leading edges 98 of each flange 96 are beneath the horizontal projections 68, and the respective bumps 32 are reversibly engaged with the flange indentations 104. The fully engaged position is attained by turning the lid slightly further in the clockwise direction from its partially engaged position so that each of the bumps 32 snaps past the respective projections 104 and into the indentations 102 on each lid flange 96. In the fully engaged position, the lid 20 is tightly locked onto the base 16 which inhibits it from being jarred loose or the like during shipping or handling and provides a good seal against dust.

The advantage of having both a first, partially engaged position and a second fully engaged position is that the lid can be more easily removed from the base from its partially engaged position, i.e., by simply turning it in a counterclockwise direction without having to snap the bumps from the flange indentations. Conversely, it takes more effort to remove it from the base from its fully engaged position because of the additional force required to snap the bumps out from the flange indentations when turning it in the opening, or counterclockwise, direction. The fully engaged position is more secure but requires more effort for lid removal.

The same procedure that was used for the first lid is used for engaging a second lid in position on the opposite side of the base. The six cover flanges of the second lid are placed between the six locking assemblies on the opposite side of the base. The second lid is then manipulated as was set forth above for the first lid for partially engaging the lid on the base or conversely for fully engaging the lid on the base.

The provision of a spindle in accordance with practice of the present invention, which is relatively tightly engaged with the hub so that it can only tilt a few degrees, aids in the disc loading operation where the top of the spindle must be located and aligned prior to the loading of discs thereon. It also eases the operation of mounting the lid on the base by maintaining the alignment of the spindle so that the top of the spindle can readily be engaged with the recess 91 at the center of the top of the lid.

The dimensions of each of the modules of the container 10 are preferably such that when the full complement of 50 CD-R discs are loaded onto the spindle 18 and the lid is locked in its fully engaged position on the base, the inside surface 110 of the ring-shaped depression 86 (best seen in FIG. 1) is in contact with the top surface surrounding the center opening of the uppermost disc. This contact, aided by the molded-in 1–2° angle of the cover and the flexible resilient plastic from which it is formed, provides a force or "preload" on the discs along the axis of the spindle, thereby holding the lid flanges 96 tightly in engagement with the base locking assemblies 64. The provision of the preload force also keeps the discs from moving and impacting each other when the container is jarred during handling or shipping. When less than the full design complement of discs are to be placed into the container provided in accordance with practice of the present invention, the preload force can be generated by installing one or more washers made of a material such as nylon or other relatively flexible plastic or other suitable material onto the spindle to take up the space normally occupied by the missing discs.

The above descriptions of the exemplary embodiments of the container are for illustrative purposes. Because of variations which will be apparent to those skilled in the art, the present invention is not intended to be limited to the particular embodiments described above. For example, turning particularly to FIG. 2, in one exemplary embodiment, the circular flange 79 on the top end of the spindle 18 incorporates a slot 108 provided for engagement with an alignment apparatus associated with a disc loading machine. Additionally, turning to FIG. 1, in one exemplary embodiment, four circumferentially spaced-apart stacking ribs 110 (only one of which is shown in FIG. 1) are on the inside surface of the lid. When stacked together, the top surface of each respective lid engages the top surfaces 112 of the stacking ribs 110 to ensure that the lids are not stacked too tightly together so as to become jammed and difficult to separate.

The scope of the invention is described in the following claims.

What is claimed is:

1. A container for removably storing a plurality of discs, the container comprising:
    a generally circular base comprising a baseplate with a transverse flange around its outer periphery, the transverse flange having an outer surface and an inner surface, wherein a plurality of spaced-apart engagement bumps are on its inner surface;
    a lid on said base, the lid having a generally circular top and a cylindrical skirt depending therefrom, said skirt having a plurality of spaced-apart flanges extending outwardly from its bottom rim, each such lid flange having an indentation for engaging one of the bumps on the base flange to thereby reversibly lock the lid onto the base; and
    a spindle removably attached to the base and extending from the base to the lid top.

2. The container according to claim 1, wherein the base has an opening through its center, and a bottom portion of said spindle extends into the opening.

3. The container according to claim 2 wherein the opening is defined by a cylindrical wall.

4. The container according to claim 3, wherein said cylindrical wall has a pair of spaced apart elongated ridges extending along a portion thereof, and wherein the bottom portion of said spindle comprises an engagement flange which snap-fits past the elongated ridges in the opening, said ridges extending radially inwardly sufficiently to engage the outer periphery of a portion of the top surface of the flange to thereby inhibit the spindle from being disengaged from the base.

5. The container according to claim 1, wherein the transverse base flange includes a plurality of radially spaced apart horizontal projections extending toward the center of the base from the flange, wherein each lid flange has a leading edge and a trailing edge, and wherein in a first engaged position, the leading edge of each lid flange is beneath one of said horizontal projections.

6. The container according to claim 5, wherein the lid flange indentation is closer to the leading edge than the trailing edge, and in a second engaged position the leading edge of each lid flange is beneath the horizontal projection and an engagement bump is reversibly engaged with the lid flange indentation.

7. The container according to claim 6, wherein each such lid flange has an outwardly extending projection adjacent the flange indentation, wherein the outwardly extending projection is closer to the leading edge than is the indentation.

8. The container according to claim 1, wherein the transverse base flange extends above and below the plane of the baseplate, wherein the plurality of spaced apart engagement bumps comprises two sets of such bumps, a first set on the first side of the baseplate plane and the second set on the second side of the baseplate plane, wherein a first lid is on one side of the base and a second lid is in the opposite side of the base, the flanges of the first lid reversibly engaged with the first set of engagement bumps and the flanges of the second lid reversibly engaged with the second set of engagement bumps.

9. The container according to claim 1, wherein each such lid flange has a leading edge and a trailing edge and has an outwardly extending projection adjacent the flange indentation, wherein the outwardly extending projection is closer to the leading edge than is the indentation.

10. The container according to claim 1, wherein the spindle comprises an elongated post with an engagement flange on its bottom end and a top end, and the lid includes a downwardly opening recess at the center of the circular lid top, wherein the engagement flange is removably coupled to the base and the top of said spindle is engaged in the lid recess.

11. The container according to claim 1, wherein the circular top of the lid has a ring-shaped depression formed in its center such that the inside surface of the ring-shaped depression is closer to the base than is the inner surface of the top surrounding the depression.

12. The container according to claim 1, wherein the circular top slopes at an angle of 1–2° from the skirt/circular top junction toward its center.

13. The container according to claim 1, wherein the spindle comprises an elongated post with an engagement flange on its bottom end and an alignment flange on its top end, the alignment flange having a slot in its upper surface for engagement with an alignment device of a disc loading apparatus.

14. The container according to claim 1, wherein the lid incorporates a plurality of circumferentially spaced apart ribs on its inside surface which act as stops to accommodate the stacking of one lid inside the other.

* * * * *